Patented Aug. 9, 1949

2,478,634

UNITED STATES PATENT OFFICE 2,478,634

MOLDING POWDER OF PHENOL-ACETALDEHYDE RESIN CONTAINING MANILKARA WOOD FLOUR

James H. Lum, Dayton, Ohio, assignor to Monsanto Chemical Company, St. Louis, Mo., a corporation of Delaware No Drawing. Application November 19, 1943, Serial No. 510,919

1 Claim. (Cl. 260—17.2)

This application is a continuation-in-part of my copending application Serial No. 375,269, filed January 21, 1941, now Patent No. 2,337,523, issued Dec. 21, 1943, and relates to new and improved phenolic plastic materials.

In the copending application referred to above, there are described plastic materials containing as filler a wood flour prepared from wood of the tropical tree known as Manilkara or Mimusops. Plastic materials therein contemplated are such basic plastic materials as phenol-formaldehyde resins, urea-aldehyde resins, vinyl resins, alkyd resins, cellulose derivatives and the like. I have now found that fillers of the type referred to above are also advantageously employed with plastic or resinous materials obtainable by condensation of phenols with aldehydes higher than formaldehyde. For convenience such condensation products will be referred to throughout this specification as phenol-higher aldehyde resins.

The phenol-higher aldehyde resins with which the present invention is concerned are resinous or plastic materials which are prepared by reaction of phenol with such higher aldehydes as acetaldehyde, propionaldehyde, acrolein, crotonaldehyde, butyraldehyde, alpha-ethyl-beta-propylacrolein, benzaldehyde, tolualdehyde, furfural, etc. Condensation products of phenol with higher aldehydes, i. e., with aldehydes of from 2 to 8 carbon atoms are well known.

Phenol-higher aldehyde molding powders containing my improved filler may be produced by incorporating with the base plastic material a wood flour prepared from wood of the Manilkara species and particularly good results may be obtained by the use of the wood of the massaranduba tree. For satisfactory incorporation into a plastic composition I may reduce the wood to flour in known manner, that is, by grinding as by attrition, impact, or by other reduction methods, to the point where the flour passes a 100 mesh screen. Due to the ready wettability of the flour by the resin it is possible to incorporate into plastic bodies flours having a substantially coarser particle size than that customarily used. In fact, I have successfully employed wood flours having a particle size such that the material was substantially all between minus 60, plus 100 mesh. For the purpose of obtaining high impact strength, I may advantageously employ the coarser sizes of flour, without encountering difficulty due to restricted flow, impaired finish and poor water resistance.

Due to the high flowability of the plastic resin composition incorporating my improved filler, I find it possible to decrease substantially the proportion of resin with respect to the filler without sacrifice of desirable properties. It is also possible by virtue of the fact that the plastic composition including my improved filler has greater flowability to employ it in the molding of large objects.

Thus it is possible to employ proportions of resin and filler varying from 1 part by weight of resin with 1 part of filler to 1 part of resin with as much as 2.0 parts of filler as the major part of the molding powder. To such ingredients may be added the customary dyes, pigments, mold lubricants, etc., as may be found necessary. Moreover, due to the high flowability imparted to the molding powder by reason of the use therein of the Manilkara wood flour filler, I may employ such Manilkara wood flour as only a part of the filler, using for the remainder of the filler any of the other fillers, wood flour fillers or others, lacking this property. Thus suitable fillers may comprise Manilkara wood flour mixed with such fillers as white pine flour, cotton floc, asbestos fiber, barium sulfate, etc.

As stated above, the type of wood preferably employed is that known as Manilkara or Mimusops which two names are substantially synonymous as used by botanists. A well known member of this species of tree is the massaranduba which is found principally in the lower Amazon region of Brazil, where it grows to a very large size. While the tree occurs both in tropical America and tropical Europe, the woods of the American species are similar in structure. The heartwood is red or reddish brown, deepening upon exposure, with oily appearance and feel in some West Indian species, distinct but usually not sharply demarcated from the whitish sapwood. The luster is low. It is without pronounced odor or taste. Generally extremely hard, heavy and strong, its specific gravity as air dried is 0.5 to 1.2 and it weighs from 56 to 75 pounds per cubic foot. It is easy to moderately difficult to work, finishes very smoothly and is highly durable for the usual purposes.

The wood of this species is described as follows:

"Growth rings sometimes distinct due to narrow poreless zones. Pores small to very small, fairly numerous; mostly in small multiples arranged in radial or oblique series frequently visible without lens. Tyloses abundant; inter-vascular pitting rather fine. Rays 1 or 2, infrequently 3, cells wide and up to 30 cells high; decidedly heterogeneous; gum deposits abundant in heartwood; disjunctive cells present; pits to vessels in part rather large, rounded to much elongated. Wood parenchyma in numerous, narrow, uniform to very irregular, evenly to unevenly spaced concentric bands; sometimes with local tendencies to be coarsely reticulate; crystals common. Wood fibers with very thick walls and very small cavities."

The invention is further illustrated, but not limited, by the following examples, the quantities of ingredients being expressed as parts by weight:

Example 1

This example describes the use of massaranduba wood flour (—60 mesh) as filler for a phenol-furfural resin.

A molding powder composition was made of the following ingredients:

| | Parts |
|---|---|
| Phenol-furfural resin compound | 47.5 |
| Massaranduba wood flour (—60 mesh) | 47.5 |
| Burnt umber | 5.0 |

The phenol-furfural resin compound employed in this example is a resin known to the trade as "Durite 221X," which material is a lump phenol-furfural resin ground into powder form to which has been added a lubricant.

The molding powder composition described above is intimately incorporated in the ball mill, then rolled employing a front roll temperature of 210° F., back roll temperature of 290° F. for a time of 2 minutes. This composition upon testing in the Olsen-Bakelite flow tester at 150° C., 700 lbs. per sq. in., showed a flow of 1.29 inches. The curing time was about 97 seconds, the finish good, water absorption 0.88%.

For comparison, tests were run made from a molding powder composition in which white pine wood flour, instead of massaranduba wood flour was used as filler. This molding powder was made of the following ingredients:

| | Parts |
|---|---|
| Phenol-furfural resin compound | 47.5 |
| White pine wood flour (—100 mesh) | 47.5 |
| Burnt umber | 5.0 |

The phenol-furfural resin compound was the same as that used for the tests with massaranduba wood flour described above. This mixture was ball milled as in the massaranduba wood flour test, and rolled at the same temperature for the same period of time.

Upon testing in the Olsen-Bakelite flow tester I obtained a flow of only 0.35 inch at 150° C. and 700 pounds. The finish of the material was good, but slightly rubbery, in spite of the fact that here a smaller meshed filler was employed than in the massaranduba wood test. The cure of this molding compound and the water absorption closely approximated the values obtained for the massaranduba mixture.

This example illustrates the greatly increased flow which I may obtain by the use of my improved filler without sacrifice of water absorption value, speed of cure, or finish.

Due to the great increase in flow produced by my improved filler I may advantageously decrease the percentage of resin in the molding powder without sacrificing desirable properties.

Example 2

A molding powder composition was prepared containing the following ingredients:

| | Parts |
|---|---|
| Phenol-acetaldehyde resin compound | 47.5 |
| Massaranduba wood flour (—60 mesh) | 47.5 |
| Burnt umber | 5.0 |

The phenol-acetaldehyde resin compound employed was a finely ground, two-stage phenol-acetaldehyde resin containing 10 parts of hexamethylenetetramine per 100 parts of resin. It had been incorporated with the required amount of lime (3 parts) and lubricant (1 part).

The molding powder composition described above was intimately incorporated in the ball mill and then rolled, employing a front roll temperature of 210° F., back roll temperature of 290° F. for a time of 2 minutes. This composition upon testing in the Olsen-Bakelite flow tester at 150° C., 700 pounds per square inch, showed a flow of 7.8 inches. The curing time was about 60 seconds, the finish good, water absorption 0.99%.

When white pine wood flour (—100 mesh) was substituted for massaranduba wood flour in the molding powder formula given above, and the resulting molding powder composition was incorporated in the ball mill and rolled under the conditions of time and temperature given above for the massaranduba wood flour test, the Olsen-Bakelite flow value of the product was much lower. This composition upon testing in the flow tester at 150° C., 700 pounds per square inch, showed a flow of only 0.33 inch. The curing time was 56 seconds, the finish was good but slightly rubbery and the water absorption was 0.91%.

Example 3

A molding powder composition was prepared containing the following ingredients:

| | Parts |
|---|---|
| Phenol-acrolein resin compound | 47.5 |
| Massaranduba wood flour (—60 mesh) | 47.5 |
| Burnt umber | 5.0 |

The phenol-acrolein resin used in the above mixture was obtained by reaction of phenol with acrolein in the presence of very small amounts of an acid catalyst. The phenol-acrolein resin compound contained 100 parts of the ground resin, 10 parts of hexamethylenetetramine, 1.5 parts of lime, and 1 part of zinc stearate.

The molding powder composition described above was intimately incorporated in the ball mill and then rolled under the same conditions of time and temperature employed in the preceding examples. When tested in the Olsen-Bakelite flow tester it showed a flow of 1.31 inches at a temperature of 150° C. and a pressure of 700 pounds per square inch. The cure was obtained in about 50 seconds, the finish was good, and water absorption was 0.86%.

When white pine wood flour (—100 mesh) was substituted for massaranduba wood flour in the molding powder formula given above and the resulting mixture was ball milled and rolled as previously described, the Olsen-Bakelite flow value of the product at a temperature of 150° C. and a pressure of 700 pounds per square inch was only 0.85 inch. The curing time was 82 seconds, the finish was poor and without luster, and the water absorption was 0.99%.

Accordingly, when pine wood flour is substituted for massaranduba wood flour in phenol-acrolein molding compositions the molded product which is obtained is decidedly inferior to the corresponding massaranduba wood flour material with respect to flow, curing time, finish and water-absorption.

Similar advantages are obtained by employing massaranduba wood flour as a filler for other phenol-higher aldehyde resins, for example, phenol-benzaldehyde resin or phenol-butyraldehyde resin.

The preceding examples are given by way of illustration only and it will be obvious that I may incorporate with my improved filler any of the ordinary or usual type fillers which are known to the art with advantageous results imparted to the composition. Thus I may incorporate with my Manilkara wood flour, fillers such as white pine flour, mica, shale, barite, chalk, asbestos, kaolin, iron oxide, cotton floc, cellulose, etc.

What I claim is:

A molding powder composition comprising the following ingredients:

| | Parts |
|---|---|
| Phenol-acetaldehyde resin | 1 |
| Manilkara wood flour | 1 to 2.0 |

JAMES H. LUM.

REFERENCES CITED

The following references are of record in the file of this patent:

UNITED STATES PATENTS

| Number | Name | Date |
|---|---|---|
| 1,598,546 | Baekeland | Aug. 31, 1926 |
| 1,974,605 | Ellis | Sept. 25, 1934 |
| 2,337,523 | Lum | Dec. 21, 1943 |